(12) United States Patent
Takahashi et al.

(10) Patent No.: US 10,344,826 B2
(45) Date of Patent: Jul. 9, 2019

(54) GEAR DEVICE

(71) Applicant: NABTESCO CORPORATION, Tokyo (JP)

(72) Inventors: Masahiro Takahashi, Mie (JP); Yuto Nakai, Mie (JP); Koji Nakamura, Mie (JP)

(73) Assignee: NABTESCO CORPORATION, Tokyo (JP)

( * ) Notice: Subject to any disclaimer, the term of this patent is extended or adjusted under 35 U.S.C. 154(b) by 68 days.

(21) Appl. No.: 15/639,433

(22) Filed: Jun. 30, 2017

(65) Prior Publication Data

US 2018/0017133 A1 Jan. 18, 2018

(30) Foreign Application Priority Data

Jul. 12, 2016 (JP) .................................. 2016-137895

(51) Int. Cl.
*F16H 1/32* (2006.01)

(52) U.S. Cl.
CPC .......... *F16H 1/32* (2013.01); *F16H 2001/323* (2013.01); *F16H 2001/327* (2013.01)

(58) Field of Classification Search
USPC ......................................................... 475/179
See application file for complete search history.

(56) References Cited

U.S. PATENT DOCUMENTS

| 4,567,790 A | * | 2/1986 | Butterfield | F16H 25/06 |
| | | | | 475/168 |
| 5,123,884 A | * | 6/1992 | Kondoh | F16H 1/32 |
| | | | | 464/89 |
| 5,188,572 A | * | 2/1993 | Yamaguchi | F16H 1/32 |
| | | | | 475/168 |
| 5,286,237 A | * | 2/1994 | Minegishi | F16H 1/32 |
| | | | | 475/178 |
| 5,290,208 A | * | 3/1994 | Minegishi | F16H 1/32 |
| | | | | 475/176 |
| 5,433,672 A | * | 7/1995 | Tanaka | F16H 1/32 |
| | | | | 475/178 |

(Continued)

FOREIGN PATENT DOCUMENTS

| CN | 101813072 A | 8/2010 |
| DE | 112013004942 T5 | 7/2015 |

(Continued)

OTHER PUBLICATIONS

Extended European Search Report EP Application No. 17179683.2 dated Dec. 14, 2017.

*Primary Examiner* — Dirk Wright
(74) *Attorney, Agent, or Firm* — Pillsbury Winthrop Shaw Pittman, LLP

(57) ABSTRACT

A gear device is provided with inner-tooth pins fitted into pin grooves of an outer cylinder, a carrier housed inside the outer cylinder, a crankshaft rotatably supported on the carrier, an oscillating gear having outer teeth meshable with the inner-tooth pins and configured to oscillate in conjunction with rotation of the crankshaft, while the outer teeth are meshed with the inner-tooth pins, and a restriction member configured to restrict movement of the inner-tooth pins in an axial direction. The restriction member is mounted to the outer cylinder on an outer side of the outer cylinder.

14 Claims, 9 Drawing Sheets

(56) References Cited

U.S. PATENT DOCUMENTS

| | | | | |
|---|---|---|---|---|
| 8,029,400 B2* | 10/2011 | Nakamura | ............... | B25J 9/102 |
| | | | | 475/162 |
| 8,900,084 B2* | 12/2014 | Kato | ........................ | F16H 1/32 |
| | | | | 475/168 |
| 9,593,743 B2* | 3/2017 | Okimura | ................... | F16H 1/32 |

FOREIGN PATENT DOCUMENTS

| | | |
|---|---|---|
| DE | 102015206693 A1 | 10/2015 |
| EP | 0 114 561 A1 | 8/1984 |
| JP | 5779120 B2 | 9/2015 |
| WO | 2014117598 A1 | 8/2014 |
| WO | 2015/008612 A1 | 1/2015 |

\* cited by examiner

GEAR DEVICE

BACKGROUND OF THE INVENTION

1. Technical Field

The present invention relates to a gear device having an inner-tooth pin inside an outer cylinder.

2. Background

As an eccentric oscillating gear device for driving a robot member or the like, as described in Japanese Patent No. 5779120, there is known a gear device that has an inner-tooth gear and an outer-tooth gear and extracts relative rotation between the inner-tooth gear and the outer-tooth gear as relative rotation between a carrier and a casing. This inner-tooth gear has a cylindrical casing, an outer pin supported in a pin groove formed on an inner peripheral surface of said casing and thus constituting an inner tooth, a pair of retaining rings that restrict movement of the outer pin in an axial direction, and a restriction member interposed between the retaining rings and the outer pin.

On the inner peripheral surface of the cylindrical casing, concave portions are formed on both sides of the pin groove in the axial direction, respectively. With the outer pin fitted into the pin groove, by the pair of retaining rings latched to the concave portions, respectively, movement of the outer pin in the axial direction is restricted via the above-described restriction member.

In the above-described eccentric oscillating gear device, in order to mount the pair of retaining rings for restricting movement of the outer pin in the axial direction, work is required to fit said pair of retaining rings into the concave portions formed on the inner peripheral surface of the casing, leading to a problem that assembling workability is hardly improved.

SUMMARY OF THE INVENTION

The present invention has as its object to provide a gear device capable of improving assembling workability in a configuration having a pin constituting an inner tooth.

A gear device of the present invention is a gear device for transmitting a rotational force at a predetermined speed reduction ratio between a pair of counterpart members. This gear device is provided with an outer cylinder fixable to one of counterpart members and having a plurality of pin grooves formed in an inner peripheral surface thereof, the plurality of pin grooves extending in an axial direction of said outer cylinder, a plurality of inner-tooth pins fitted into the plurality of pin grooves of the outer cylinder, respectively, a carrier housed inside the outer cylinder and fixable to the other counterpart member, a crankshaft rotatably supported on the carrier, an oscillating gear having outer teeth meshed with the plurality of inner-tooth pins and configured to oscillate in conjunction with rotation of the crankshaft, while the outer teeth are meshed with the plurality of inner-tooth pins, and a restriction member configured to restrict movement of the plurality of inner-tooth pins in the axial direction. The restriction member is mounted to the outer cylinder on an outer side of the outer cylinder.

According to the gear device of the present invention, in a configuration having an inner-tooth pin constituting an inner tooth, assembling workability can be improved.

Objects, features, and advantages of the above-mentioned technique will become more apparent from the following detailed description and the appended drawings.

DESCRIPTION OF EMBODIMENT

With reference to the appended drawings, an embodiment for implementing the present invention will now be described in detail.

A gear device according to this embodiment is an eccentric oscillating gear device. This gear device is used for various applications including, for example, a speed reducer in a wheel steering device such as a power steering device in an automobile, in a revolving portion such as a revolving body, an arm joint, or the like of a robot, or in a revolving portion of various types of machine tools.

Figure 1:
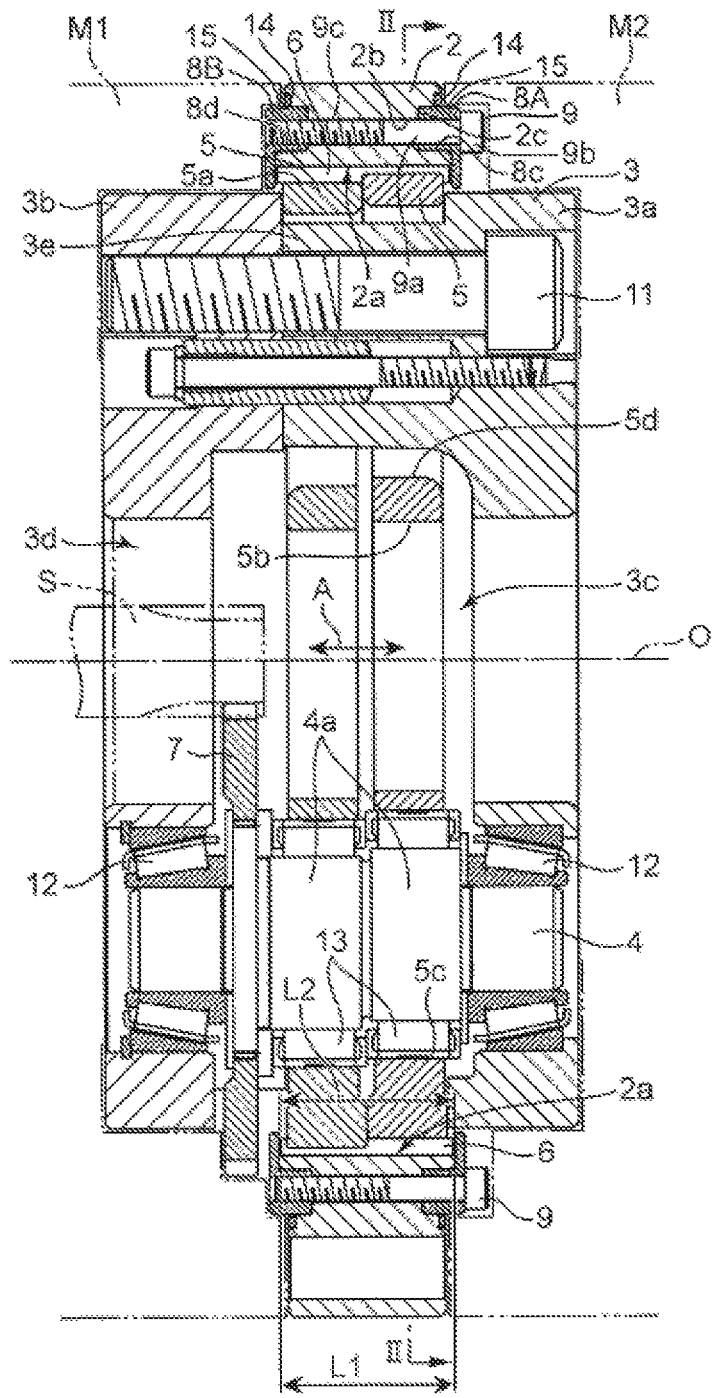
FIG. 1 is a sectional view of a gear device according to an embodiment of the present invention.

As shown in FIG. 1, a gear device 1 according to this embodiment may transmit a rotational force at a predetermined speed reduction ratio between a pair of counterpart members composed of a base M1 and a revolving member M2 coupled to each other so as to be relatively rotatable. The base M1 on a static side and the revolving member M2 on a rotary side may be coupled to each other so as to be relatively rotatable via a main bearing (not shown) provided outside the gear device 1. The base M1 may be encompassed by a concept of one of the counterpart members. The revolving member M2 may be encompassed by a concept of the other counterpart member.

Figure 2:
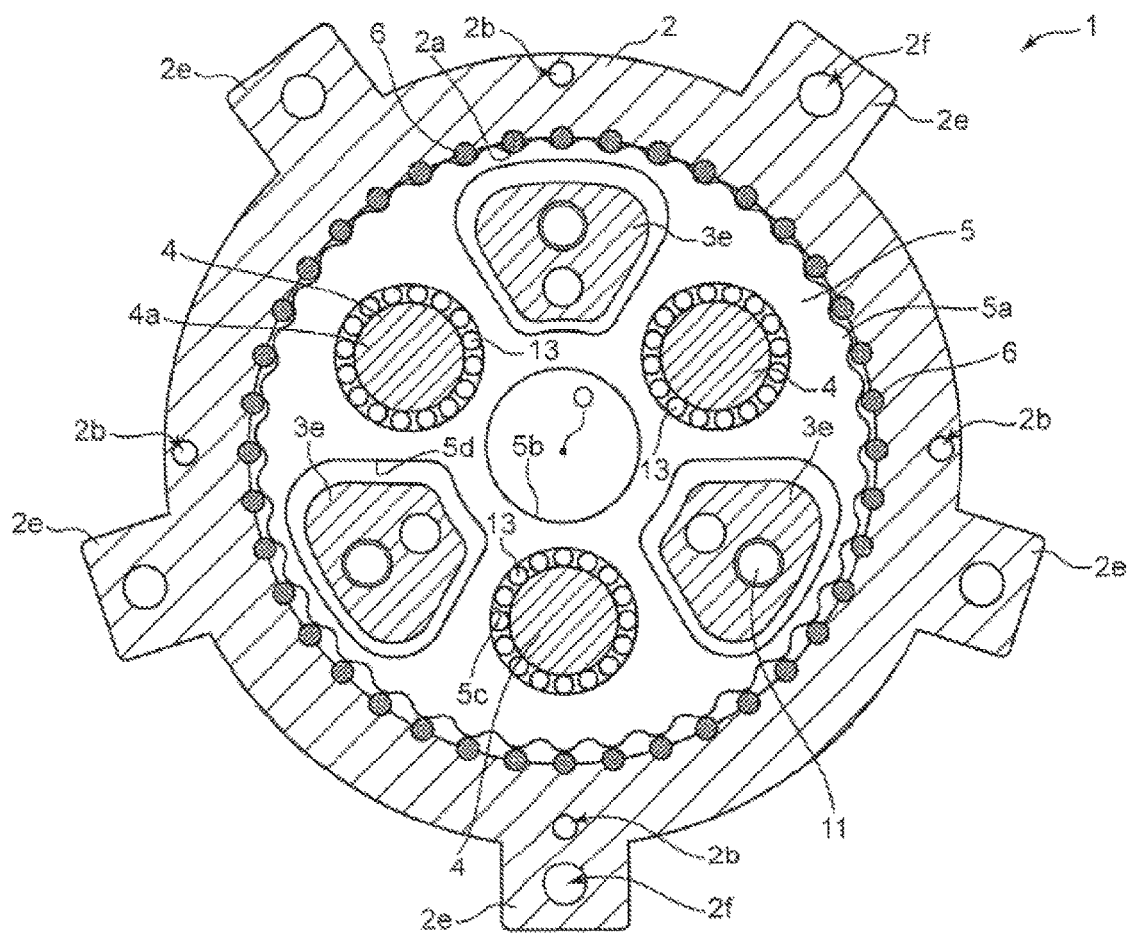
FIG. 2 is a sectional view along a line II-II in FIG. 1.

As shown in FIGS. 1 to 2, the gear device 1 of this embodiment may be provided with an outer cylinder 2, a carrier 3, a crankshaft 4, an oscillating gear 5, a plurality of inner-tooth pins 6, a transmission gear 7, a pair of ring-shaped restriction members (a first restriction member 8A and a second restriction member 8B), a plurality of bolts 9 that fix said pair of restriction members 8A and 8B to the outer cylinder 2, and an O ring 14. In a state of penetrating the outer cylinder 2 in an axial direction A, each of the bolts 9 may fix said pair of restriction members 8A and 8B to end surfaces 2g (see FIG. 3) of the outer cylinder 2 on both sides thereof, which face the axial direction A, respectively.

The outer cylinder 2 may be a substantially cylindrical member and function as a case constituting an outer surface of the gear device 1. On an inner peripheral surface of the outer cylinder 2, a plurality of pin grooves 2a extending in the axial direction A of said outer cylinder 2 may be formed at regular intervals along the inner peripheral surface of said outer cylinder 2. Each of the pin grooves 2a may be a groove having a substantially semicircular cross section and formed to penetrate the outer cylinder 2 in the axial direction A. The inner-tooth pins 6 may be partly fitted into the pin grooves 2a. Each of the inner-tooth pins 6 may be a circular columnar thin pin and function as an inner tooth meshed with the oscillating gear 5 formed of an outer-tooth gear.

Figure 3:
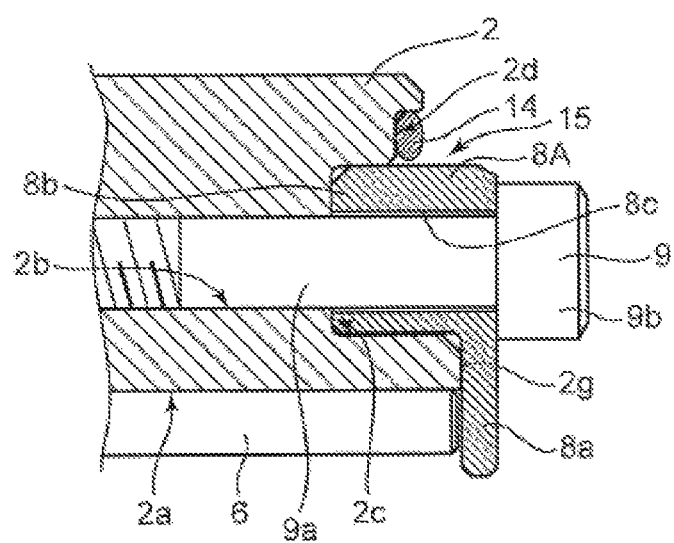
FIG. 3 is an enlarged sectional view of a fitting portion between a protrusion of a first restriction member and a bore of an outer cylinder.

As shown in FIGS. 1 to 3, a plurality of bolt holes 2b (at four locations in FIG. 2) into which the bolts 9 are inserted may be formed in the outer cylinder 2. Each of the bolt holes 2b may be formed to penetrate the outer cylinder 2 in the axial direction A.

In each of the end surfaces 2g of the outer cylinder 2 on the both sides thereof, which face the axial direction A, a bore 2c into which a protrusion 8b of a corresponding one of the pair of restriction members 8A and 8B is fitted may be formed. That is, in each of the end surfaces 2g of the outer cylinder 2 in the axial direction A, the bore 2c may be formed over an entire circumference of said outer cylinder 2 in a circumferential direction thereof. The bore 2c may be formed in a circular ring shape concentric with a center axis O of the outer cylinder 2. The bore 2c may be formed at a position communicating with each of the bolt holes 2b, in other words, at such a position that an axial center of each of the bolt holes 2b is positioned within a range of the bore 2c.

Moreover, in each of the end surfaces 2g of the outer cylinder 2 on the both sides thereof in the axial direction A, an annular O ring groove 2d may be formed at a position on a radially outer side with respect to the bore 2c. Similarly, to the bore 2c, the O ring groove 2d may be formed in a circular ring shape concentric with the center axis O of the outer cylinder 2. The O ring 14 may be fitted into the O ring groove 2d and thus be disposed at a position on an outer side in a radial direction of the outer cylinder 2 with respect to the bore 2c on each of the end surfaces 2g of the outer cylinder 2 in the axial direction A. The O ring 14 may be a ring-shaped seal member that prevents a liquid from leaking to a radially outer side of the outer cylinder 2. It may also be possible that, instead of the O ring 14 being fitted into the O ring groove 2d, a thin plate-shaped seal ring is disposed at a position on an outer side in the radial direction of the outer cylinder 2 with respect to the bore 2c.

On a side surface on an outer peripheral side of the outer cylinder 2, a plurality of ribs 2e may be provided radially toward a radially outer side of said outer cylinder 2. In each of the ribs 2e, there may be formed a through hole 2f into which a bolt (not shown) for fixing the base M1 as one of the counterpart members is inserted. The outer cylinder 2 may be fastened to the base M1 with the bolt (not shown) inserted into said through hole 2f.

As shown in FIG. 1, a length of the outer cylinder 2 in the axial direction A (a maximum length L1 in the outer cylinder 2) may be set to be equal to a length (L2) of the inner-tooth pins 6. Thus, the outer cylinder 2 and the gear device 1 including the same as a whole can be reduced in dimensions.

Figure 4:
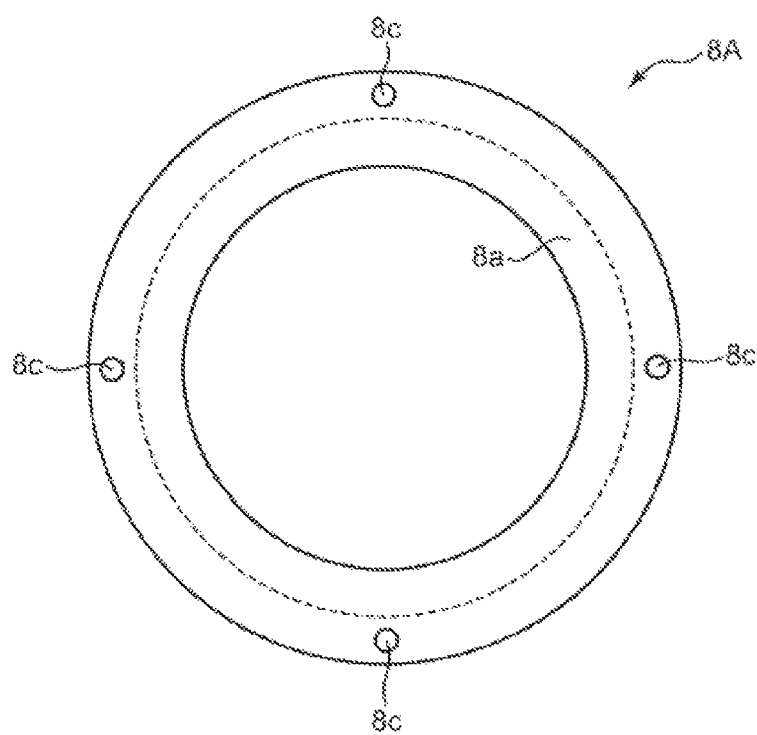
FIG. 4 is a view of the first restriction member shown in FIG. 1 as seen from an opposite side to the protrusion.
Figure 5:
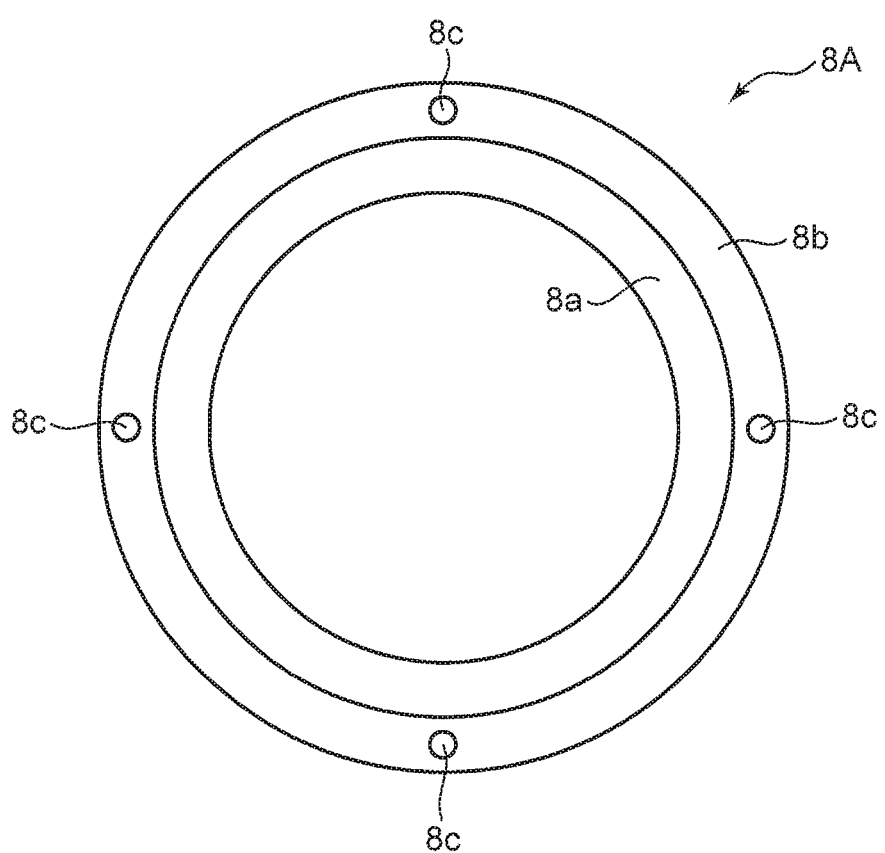
FIG. 5 is a view of the first restriction member shown in FIG. 1 as seen from a protruding side of the protrusion.
Figure 6:
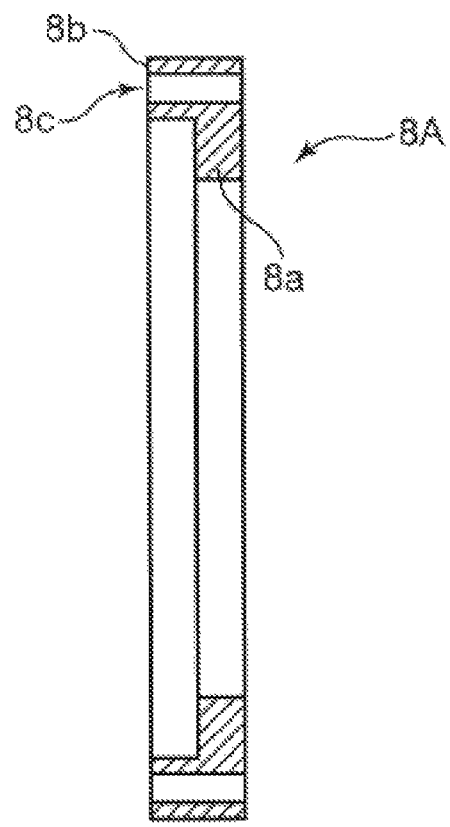
FIG. 6 is a sectional view of the first restriction member shown in FIG. 1.

As shown in FIG. 1 and FIG. 3, the pair of restriction members 8A and 8B may be members that restrict movement of the inner-tooth pins 6 in the axial direction A. Each of the restriction members 8A and 8B may be formed in a ring shape. Specifically, as shown in FIGS. 4 to 6, the first restriction member 8A may have a contact portion 8a that is opposed to and comes in contact with one of the end surfaces 2g of the outer cylinder 2 in the axial direction A and a protrusion 8b that protrudes from said contact portion 8a toward the outer cylinder 2 in the axial direction A. Similarly, to the first restriction member 8A, the second restriction member 8B may have the contact portion 8a and the protrusion 8b.

The contact portion 8a may be formed of a thin plate and be ring-shaped. The contact portion 8a may extend to an inner side in the radial direction of the outer cylinder 2 with respect to an end surface of each of the inner-tooth pins 6 fitted into the pin grooves 2a, respectively. Movement of each of the inner-tooth pins 6 in the axial direction A may be restricted by the contact portion 8a.

The protrusion 8b may be a ring-shaped section having a cross section corresponding to a cross-sectional shape of the bore 2c of the outer cylinder 2. A through hole 8c penetrated by each of the bolts 9 may be formed in the protrusion 8b of the first restriction member 8A. A female screw hole 8d (see FIG. 1) screwed onto a male screw portion 9c of each of the bolts 9 may be formed in the protrusion 8b of the second restriction member 8B.

The pair of restriction members 8A and 8B may be mounted to outer sides of the outer cylinder 2 in the axial direction A, respectively. Specifically, the pair of restriction members 8A and 8B may be mounted in a state of being in contact with the end surfaces 2g (see FIG. 3) of the outer cylinder 2, which face the axial direction A. More specifically, first, while the respective contact portions 8a of the restriction members 8A and 8B may be brought in contact with the end surfaces 2g of the outer cylinder 2 in the axial direction A, the respective protrusions 8b of the restriction members 8A and 8B may be fitted into the bore 2c of the outer cylinder 2, respectively, and thus the restriction members 8A and 8B may be temporarily mounted. Subsequently, a shaft portion 9a of each of the bolts 9 may be inserted into the through hole 8c of the first restriction member 8A, and the male screw portion 9c formed at a distal end of the shaft portion 9a of said each of the bolts 9 may be screwed into the female screw hole 8d of the second restriction member 8B. Thus, the pair of restriction members 8A an 8B can be mounted in a state of being in contact with the above-described end surfaces 2g (see FIG. 3), respectively.

In this embodiment, a head portion 9b of each of the bolts 9 may be disposed at one of the end surfaces 2g of the outer cylinder 2 in the axial direction A, which is on an opposite side to the transmission gear 7. This can avoid a possibility of interference between the head portion 9b of each of the bolts 9 and the transmission gear 7.

The pair of restriction members 8A and 8B may protrude in the axial direction A from the end surfaces 2g of the outer cylinder 2 in the axial direction A, respectively. This protruding portion of each of the restriction members 8A and 8B and a corresponding one of said end surfaces 2g may form a stepped portion 15. Each of the pair of counterpart members (the base M1 and the revolving member M2) to which the gear device 1 is coupled may be partly fitted to the stepped portion 15 (so-called socket-and-spigot joining), and thus respective axial centers of the gear device 1 and the pair of counterpart members (the base M1 and the revolving member M2) can be easily aligned with each other. The present invention may not be limited to a configuration in which each of a pair of counterpart members and a restriction member are fitted to each other.

As shown in FIG. 1, the carrier 3 may be housed in the outer cylinder 2 as it is disposed coaxially with the outer cylinder 2. The carrier 3 can rotate relative to the outer cylinder 2 about the same axis as that of the outer cylinder 2. The carrier 3 may be fixed to the revolving member M2 with a bolt or the like. The carrier 3 may rotate relative to the outer cylinder 2, and thus the revolving member M2 can revolve relative to the base M1.

While in this embodiment, the carrier 3 may be fastened to the revolving member M2 and revolve together therewith, while the outer cylinder 2 may be fixed to the base M1 and thus be immovable, needless to say, it may also be possible to adopt a configuration in which the outer cylinder 2 is fastened to the revolving member M2, while the carrier 3 is fastened to the base M1.

The carrier 3 of this embodiment may be provided with a base portion 3a and an end plate portion 3b. Between the base portion 3a and the end plate portion 3b, there may be formed a housing space 3c for housing the oscillating gear 5 that transmits a rotational force between the outer cylinder 2 and the carrier 3. The housing space 3c may communicate with a through hole 3d communicating with the outside of the carrier 3.

The base portion 3a may have a shaft portion 3e extending in the axial direction A toward the end plate portion 3b. The shaft portion 3e may be fastened to the end plate portion 3b with a bolt 11. The base portion 3a and the end plate portion 3b may be manufactured by using cast iron or the like. As a structure for fixing the revolving member M2, for example, a female screw hole into which a bolt is screwed may be formed in an end surface of the base portion 3a, which faces the axial direction A.

A plurality of crankshafts 4 may be disposed at regular intervals around the center axis O of the outer cylinder 2. The transmission gear 7 may be mounted to each of the crankshafts 4. Each of the transmission gears 7 may be meshed with an output gear S driven by a motor (not shown). Thus, each of the transmission gears 7 can transmit a rotational drive force of the motor to a corresponding one of the crankshafts 4. Each of the crankshafts 4 may be rotatably supported to the carrier 3 via a pair of crank bearings 12. While the transmission gear 7 shown in FIG. 1 may be disposed between the pair of crank bearings 12, the present invention may not be limited thereto. It may also be possible that the transmission gear 7 is disposed on an outer side of a region interposed between the pair of crank bearings 12.

Each of the crankshafts 4 may have a plurality of (in this embodiment, two) eccentric portions 4a. The plurality of eccentric portions 4a may be disposed at a position between the pair of crank bearings 12 so as to be arranged in the axial direction A. Each of the eccentric portions 4a may be formed in a circular columnar shape eccentric from a shaft center of the each of the crankshafts 4 by a predetermined eccentricity amount. The eccentric portions 4a may be formed on the each of the crankshafts 4 so as to have a phase difference of a predetermined angle from each other.

As shown in FIGS. 1 to 2, the oscillating gear 5 may have a plurality of outer teeth 5a that can be meshed with the inner-tooth pins 6. The oscillating gear 5 may be supported to the carrier 3 so that the oscillating gear 5 oscillates in conjunction with rotation of the crankshafts 4, while the outer teeth 5a are meshed with the inner-tooth pins 6. In this embodiment, two oscillating gears 5 may be provided in the carrier 3. The two oscillating gears 5 may be mounted to the eccentric portions 4a of each of the crankshafts 4 via roller bearings 13, respectively. The oscillating gears 5 may each be formed to be slightly smaller than an inner diameter of the outer cylinder 2, and when the crankshafts 4 rotate, the oscillating gears 5 may perform oscillating rotation in conjunction with eccentric rotation of the eccentric portions 4a, while being meshed with the inner-tooth pins 6 on an inner surface of the outer cylinder 2. The number of teeth (the number of the outer teeth 5a) of each of the oscillating gears 5 may be set to be slightly smaller than the number of the internal-tooth pins 6.

As shown in FIGS. 1 to 2, each of the oscillating gears 5 may have a center portion through hole 5b, a plurality of eccentric portion insertion holes 5c, and a plurality of shaft portion insertion holes 5d.

The eccentric portion insertion holes 5c may be provided at regular intervals in a circumferential direction around the center portion through hole 5b in each of the oscillating gears 5. The eccentric portions 4a of each of the crankshafts 4 may be inserted through each of the eccentric portion through holes 5c, with the rolling bearings 13 interposed therebetween.

The shaft portion insertion holes 5d may be provided at regular intervals in the circumferential direction around the center portion through hole 5b in each of the oscillating gears 5. The shaft portion insertion holes 5d may be arranged at positions between the eccentric portion insertion holes 5c in the circumferential direction. Each of the shaft portions 3e of the carrier 3 may be inserted through each of the shaft portion insertion holes 5d, with a gap provided between the each of the shaft portions 3e and an inner surface of the each of the shaft portion insertion holes 5d.

The gear device 1 shown in FIGS. 1 to 2 may operate as follows. First, upon receiving a rotational drive force from the output gear S of the motor, the transmission gear 7 coupled to each of the crankshafts 4 may cause the each of the crankshafts 4 to rotate about its axis. At this time, as each of the crankshafts 4 rotates, the eccentric portions 4a of the each of the crankshafts 4 may perform eccentric rotation. Thus, the oscillating gears 5 may perform oscillating rotation in conjunction with the eccentric rotation of the eccentric portions 4a, while being meshed with the inner-tooth pins 6 on the inner surface of the outer cylinder 2. The oscillating rotation of the oscillating gears 5 may be transmitted to the carrier 3 via the crankshafts 4. In this embodiment, the outer cylinder 2 may be fixed to the base M1 and thus be immovable. With this configuration, the carrier 3 and the revolving member M2 can rotate relative to the outer cylinder 2 and the base M1 at a rotational speed reduced from that of inputted rotation.

In the gear device 1 of this embodiment configured as above, in a configuration in which the plurality of inner-tooth pins 6 constituting inner teeth may be fitted into the plurality of pin grooves 2a of the outer cylinder 2, respectively, the restriction members 8A and 8B that restrict movement of said inner-tooth pins 6 in the axial direction A may be mounted on the outer sides of the outer cylinder 2 in the axial direction A (specifically, the end surfaces 2g facing the axial direction A), respectively. This may make it possible to easily mount the restriction members 8A and 8B to the outer sides of the outer cylinder 2, respectively, by bringing the restriction members 8A and 8B closer to said outer cylinder 2 from the axial direction A. Accordingly, assembly workability of the gear device 1 may be improved.

Furthermore, in the above-described configuration, the restriction members 8A and 8B may be mounted to the end surfaces 2g of the outer cylinder 2 in the axial direction A, and thus unlike in a conventional eccentric oscillating gear device, there may be no need to secure, in an outer cylinder, a length of a bore for fitting a retaining ring thereinto and a length of a section on an outer side thereof. This may make it possible to reduce the length L1 of the outer cylinder 2 in the axial direction A and thus to achieve size reduction of the gear device 1.

In the gear device 1 of this embodiment, the length L1 of the outer cylinder 2 in the axial direction A may be set to be equal to the length L2 of the inner-tooth pins 6. Therefore, with the restriction members 8A and 8B brought in contact with the end surfaces 2g of the outer cylinder 2, which face the axial direction A, respectively, said restriction members 8A and 8B can be brought in contact with the inner-tooth pins 6. Thus, movement of the inner-tooth pins 6 in the axial direction A can be reliably restricted.

In the gear device 1 of this embodiment, each of the restriction members 8A and 8B may be formed in a ring shape, and thus at the end surfaces 2g of the outer cylinder 2 in the axial direction A, end portion openings of the plurality of pin grooves 2a can be covered over an entire circumference of the end surfaces 2g. For all the inner-tooth pins 6 fitted into the pin grooves 2a, this may eliminate a possibility that they move in the axial direction A, thus coming off from the pin grooves 2a.

Furthermore, in the gear device 1 of this embodiment, the bore 2c may be formed in each of the end surfaces 2g of the outer cylinder 2, which face the axial direction A. Each of the restriction members 8A and 8B may have the protrusion 8b fitted into the bore 2c. Thus, in fixing the restriction members 8A and 8B to the end surfaces 2g of the outer cylinder 2 in the axial direction A by using a fixing member such as the bolts 9 or pins, the protrusion 8b of each of the restriction members 8A and 8B may be fitted into the bore 2c of the outer cylinder 2, and thus the restriction members 8A and 8B can be temporarily mounted to the end surfaces 2g of the outer cylinder 2 in the axial direction A. As a result, assembly workability of the gear device 1 may be improved.

Moreover, in the gear device 1 of this embodiment, the O ring 14 may be fitted into the O ring groove 2d formed in each of the end surfaces 2g of the outer cylinder 2, which face the axial direction A, and thus the O ring 14 may be disposed at a position on an outer side in the radial direction of the outer cylinder 2 with respect to the bore 2c on each of the end surfaces 2g of the outer cylinder 2 in the axial direction A. The O ring 14 may be interposed between the outer cylinder 2 and one of the counterpart members (namely, the base M1 or the revolving member M2), which is opposed thereto, and thus it may be possible to prevent a liquid from leaking to a radially outer side of the outer cylinder 2 through a gap formed between them. Thus, by using said O ring 14, it may be possible to avoid a possibility that a liquid such as a lubricant inside the outer cylinder 2 leaks to a radially outer side of the outer cylinder 2 through the bore 2c.

The gear device 1 of this embodiment may be provided with the bolts 9 that fixes the restriction members 8A and 8B to the end surfaces 2g of the outer cylinder 2 in the axial direction A, respectively, and thus, by using the bolts 9, the restriction members 8A and 8B can be easily fixed to the end surfaces 2g of the outer cylinder 2 in the axial direction A, respectively.

In the gear device 1 of this embodiment, the head portion 9b of each of the bolts 9 may be disposed at one of the end surfaces 2g of the outer cylinder 2 in the axial direction A, which is on an opposite side to the transmission gear 7, and thus it may be possible to avoid a possibility that the head portion 9b of any of the bolts 9 interferes with the transmission gear 7 and thus is damaged. This can resolve a trouble that a broken piece of the head portion 9b of any of the bolts 9 enters a section where the transmission gear 7 is meshed with another gear.

In the gear device 1 of this embodiment, the first restriction member 8A may have the through hole 8c into which the shaft portion 9a of each of the bolts 9 can be inserted. The second restriction member 8B may have the female screw hole 8d that can be screwed onto the male screw portion 9c formed at the distal end of the shaft portion 9a of each of the bolts 9. By this configuration, the shaft portion 9a of each of the bolts 9 can be inserted into the through hole 8c of the first restriction member 8A, and the male screw portion 9c at the distal end of the shaft portion 9a of said each of the bolts 9 can be screwed into the female screw hole 8d of the second restriction member 8B. Thus, by using the common bolts 9, the first and second restriction members 8A and 8B can be fixed to the end surfaces 2g of the outer cylinder 2 on the both sides thereof in the axial direction A, respectively. As a result, the number of bolts 9 used can be reduced.

While the gear device 1 of the foregoing embodiment may have the pair of restriction members 8A and 8B, it may also be possible to omit either one of the restriction members 8A and 8B. In that case, movement of the inner-tooth pins 6 in the axial direction A could be restricted by one of the counterpart members (the base M1 or the revolving member M2) to which the gear device 1 is coupled.

Regarding the outer cylinder 2 in the foregoing embodiment, the ribs 2e may be provided on a radially outer side of said outer cylinder 2 with respect to the bolt holes 2b penetrated by the bolts 9 that fastens the restriction members 8A and 8B. And in each of the ribs 2e, the through hole 2f penetrated by a bolt that fastens the base M1, which is one of the counterpart members, may be formed. However, as for relative positions of each of the bolt holes 2b and the through hole 2f, the present invention may not be limited thereto. As a modification example of the present invention, for example, it may also be possible that each of the bolt holes 2b and the through hole 2f are formed on the same circumference at an equal distance from the center axis O of the outer cylinder 2.

As shown in FIGS. 1 to 2, while the foregoing embodiment has described the gear device 1 provided with the two oscillating gears 5 as an example, the present invention may not be limited thereto. The present invention may be applicable also to a structure provided with only one oscillating gear 5 or a structure provided with three or more oscillating gears 5.

While in the foregoing embodiment, the length L1 of the outer cylinder 2 in the axial direction A may be set to be equal to the length L2 of the inner-tooth pins 6, the present invention may not be limited thereto. For example, in the present invention, it may also be possible that the length L1 of the outer cylinder 2 in the axial direction A is larger than the length L2 of the inner-tooth pins 6. In that case, it may also be possible that a bore is provided in each of the end surfaces 2g of the outer cylinder 2, which face the axial direction A, and the contact portion 8a of each of the restriction members 8A and 8B is inserted into said bore so as to come in contact with the inner-tooth pins 6. Alternatively, it may also be possible that a protrusion protruding inside each of the pin grooves 2a is provided on the contact portion 8a of each of the restriction members 8A and 8B so as to come in contact with the inner-tooth pins 6. Moreover, in the present invention, it may also be possible that the length L2 of the inner-tooth pins 6 is larger than the length L1 of the outer cylinder L1. Also, in that case, the restriction members 8A and 8B may be mounted to the outer sides of the outer cylinder 2 from the axial direction A, respectively, and thus the contact portion 8a thereof can be brought in contact with the inner-tooth pins 6.

Figure 7:
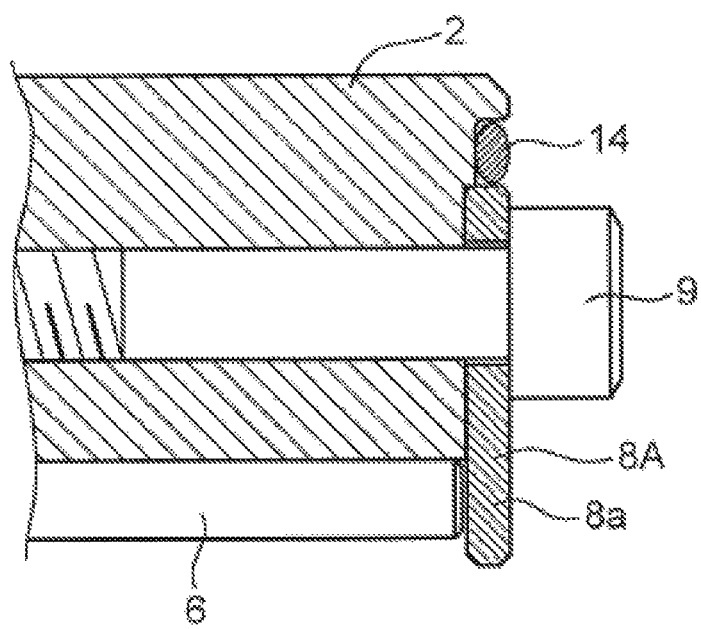
FIG. 7 is an enlarged sectional view of a first restriction member formed only of a contact portion as a modification example of the present invention and a periphery thereof.

While in the foregoing embodiment, each of the restriction members 8A and 8B may have the protrusion 8b extending in the axial direction A of the outer cylinder 2, the present invention may not be limited thereto. That is, as a modification example of the present invention, it may also be possible to adopt a configuration having only a contact portion 8a formed of a thin plate-shaped member such as a washer, as in a first restriction member 8A shown in FIG. 7. Also in this case, the restriction member 8A can be easily mounted to an outer side of the outer cylinder 2 in the axial direction.

Figure 8:
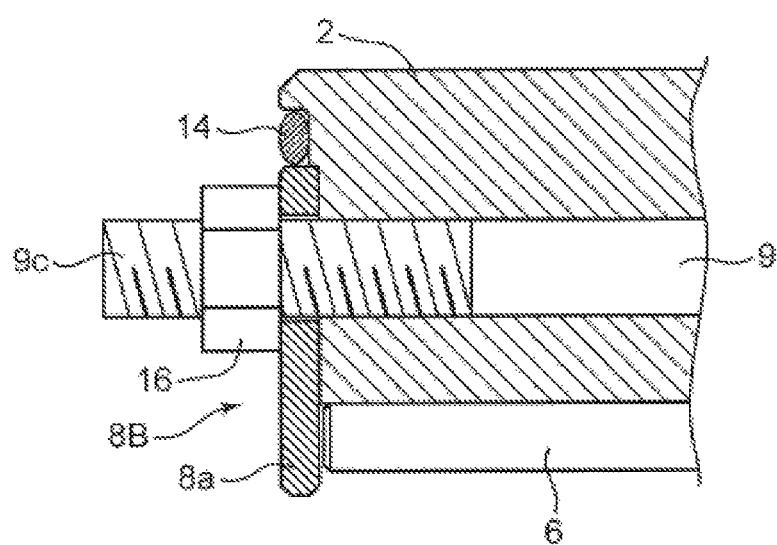
FIG. 8 is an enlarged sectional view of a second restriction member having a contact portion and a nut as another modification example of the present invention and a periphery thereof.

While in the foregoing embodiment, the second restriction member 8B may have a configuration in which the female screw hole 8d is formed in the protrusion 8b, the present invention may not be limited thereto. As another modification example of the present invention, it may also be possible that, as shown in FIG. 8, a second restriction member 8B has a thin plate-shaped contact portion 8a such as a washer and a nut 16. In that case, the male screw portion 9c of each of the bolts 9 may penetrate the contact portion 8a and be screwed into the nut 16, and thus the second restriction member 8B can be mounted to the outer cylinder 2.

Figure 9:
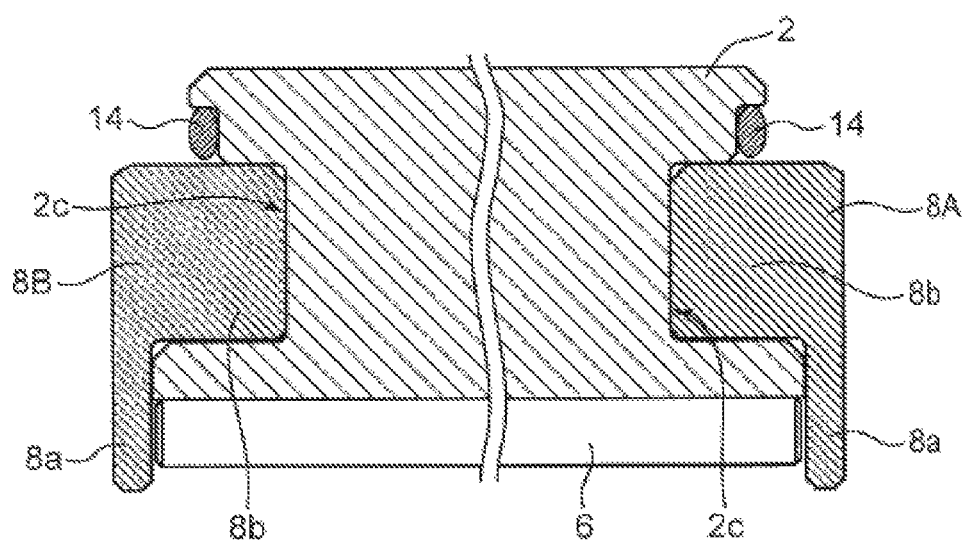
FIG. 9 is an enlarged sectional view of first and second restriction members as still another modification example of the present invention, showing a state where respective protrusions of the first and second restriction members are forcibly inserted into bores of an outer cylinder.

As still another modification example of the present invention, it may also be possible that, as shown in FIG. 9, the bolts 9 are omitted, and the protrusion 8b of each of the restriction members 8A and 8B is forcibly inserted into the bore 2c of the outer cylinder 2.

While the foregoing embodiment adopts a configuration in which the plurality of crankshafts 4 may be arranged around the center axis O of the outer cylinder 2, the present invention may not be limited thereto. For example, it may also be possible to adopt a center crank type gear device in which the crankshafts 4 are arranged at a center portion of the carrier 3.

The restriction members 8A and 8B may not be limited to a configuration in which they are mounted to the end surfaces 2g of the outer cylinder 2 in the axial direction as in the foregoing embodiment. The restriction members 8A and 8B may be only required to be mountable to the outer sides of the outer cylinder 2, respectively. For example, it may also be possible that the restriction members 8A and 8B are mounted to perpendicular surfaces of the outer cylinder 2 in the axial direction other than the end surfaces 2g. Furthermore, there may also be no limitation to a case where the restriction members 8A and 8B are mounted to such perpendicular surfaces in the axial direction, and it may also be possible that the restriction members 8A and 8B are mounted to arbitrary outer side portions of the outer cylinder 2 (for example, an outer peripheral surface of the outer cylinder 2).

The foregoing embodiment may be summarized as follows.

A gear device according to this embodiment may be a gear device for transmitting a rotational force at a predetermined speed reduction ratio between a pair of counterpart members. The gear device may be provided with an outer cylinder fixable to one of the counter part members and having a plurality of pin grooves formed in an inner peripheral surface thereof, the plurality of pin grooves extending in an axial direction of said outer cylinder, a plurality of inner-tooth pins fitted into the plurality of pin grooves of the outer cylinder, respectively, a carrier housed inside the outer cylinder and fixable to the other counterpart member, a crankshaft rotatably supported on the carrier, an oscillating gear having outer teeth meshed with the plurality of inner-tooth pins and configured to oscillate in conjunction with rotation of the crankshaft, while the outer teeth are meshed with the plurality of inner-tooth pins, and a restriction member configured to restrict movement of the plurality of inner-tooth pins in the axial direction. The restriction member may be mounted to the outer cylinder on an outer side of the outer cylinder.

According to the configuration described above, in a configuration in which the plurality of inner-tooth pins constituting inner teeth may be fitted into the plurality of pin grooves of the outer cylinder, the restriction member that restricts movement of the inner-tooth pins in the axial direction may be mounted on the outer side of the outer cylinder. This may make it possible to easily mount the restriction member to an outer side portion of the outer cylinder by bringing the restriction member closer to said outer cylinder from outside. Accordingly, assembly workability may be improved.

The above-described configuration can also achieve size reduction of the gear device. That is, in a structure of a conventional eccentric oscillating gear device, there has been a need to secure, in an outer cylinder, in addition to a length of inner-tooth pins, a width of a bore for latching a retaining ring on each of both sides of said inner-tooth pins in an axial direction and a length of a section forming a wall on an outer side with respect to said retaining ring. On the other hand, in the above-described configuration, the restriction member may be mounted to the outer cylinder from an outer side, and thus there may be no need to secure, in the outer cylinder, a length of the above-described bore and a length of the section on the outer side thereof. This may make it possible to reduce a length of the outer cylinder in the axial direction and thus to achieve size reduction of the gear device. Moreover, it may no longer be necessary to perform a process of forming a groove for mounting a retaining ring therein on the inner peripheral surface of the outer cylinder, and thus a fabrication process of the outer cylinder can also be simplified.

A length of the outer cylinder in the axial direction may be set to be equal to a length of the plurality of inner-tooth pins. In this configuration, the restriction member may be brought in contact with an end surface of the outer cylinder, which faces the axial direction, and thus said restriction member can be brought in contact with the inner-tooth pins. Thus, movement of the inner-tooth pins in the axial direction can be reliably restricted.

The restriction member may be formed in a ring shape. According to the configuration described above, at the end surface of the outer cylinder in the axial direction, the ring-shaped restriction member can cover end portion openings of the plurality of pin grooves over an entire circumference of the end surface. For all the inner-tooth pins fitted into the pin grooves, this may eliminate a possibility that they move in the axial direction, thus coming off from the pin grooves.

A bore may be formed in the end surface of the outer cylinder, which faces the axial direction. The restriction member may have a protrusion fitted into the bore. According to the configuration described above, in fixing the restriction member to the end surface of the outer cylinder in the axial direction by using a fixing member such as a bolt or a pin, the protrusion of the restriction member may be fitted into the bore of the outer cylinder, and thus the restriction member can be temporarily mounted to the end surface of the outer cylinder in the axial direction. Thus, assembly workability of the gear device may be improved.

The gear device may be provided further with a seal member disposed at a position on an outer side in a radial direction of the outer cylinder with respect to the bore in the end surface of the outer cylinder and configured to prevent a liquid from leaking to the outer side in the radial direction of the outer cylinder.

According to the configuration described above, at the end surface of the outer cylinder in the axial direction, the seal member may be disposed at a position on an outer side in the radial direction of the outer cylinder with respect to the bore, and thus by using said seal member, it may be possible to avoid a possibility that a liquid such as a lubricant inside the outer cylinder leaks to a radially outer side of the outer cylinder through the bore.

The gear device may be provided further with a bolt that fixes the restriction member to the end surface of the outer cylinder, which faces the axial direction. According to the configuration described above, by using the bolt, the restriction member can be easily fixed to the end surface of the outer cylinder in the axial direction.

The gear device may be provided further with a transmission gear fixed to an end portion of the crankshaft. A head portion of the bolt may be disposed on one of end surfaces of the outer cylinder in the axial direction, which is on an opposite side to the transmission gear.

According to the configuration described above, it may be possible to avoid a possibility that the head portion of the bolt interferes with the transmission gear and thus is damaged. This can resolve a trouble that a broken piece of the head portion of the bolt enters a section where the transmission gear is meshed with another gear.

As the restriction member, there may be included a first restriction member and a second restriction member disposed on the end surfaces of the outer cylinder on both sides thereof in the axial direction, respectively. The first restriction member may have a through hole into which a shaft portion of the bolt can be inserted. The second restriction member may have a female screw hole that can be screwed onto a male screw portion formed at a distal end of the shaft portion of the bolt.

According to the configuration described above, the shaft portion of the bolt can be inserted into the through hole of the first restriction member, and the male screw portion at the distal end of said shaft portion can be screwed into the female screw hole of the second restriction member. Thus, by using the common bolt, the first and second restriction members can be fixed to the end surfaces of the outer cylinder on the both sides in the axial direction, respectively. As a result, the number of bolts used can be reduced.

This application is based on Japanese Patent application No. 2016-137895 filed in Japan Patent Office on Jul. 12, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A gear device for transmitting a rotational force at a predetermined speed reduction ratio between a pair of counterpart members, the gear device comprising:
    an outer cylinder fixable to one of the counterpart members and having a plurality of pin grooves in an inner peripheral surface thereof, the plurality of pin grooves extending in an axial direction of said outer cylinder;
    a plurality of inner-tooth pins fitted into the plurality of pin grooves of the outer cylinder, respectively;
    a carrier housed inside the outer cylinder and fixable to the other counterpart member;
    a crankshaft rotatably supported on the carrier;
    an oscillating gear having outer teeth meshed with the plurality of inner-tooth pins and configured to oscillate in conjunction with rotation of the crankshaft, while the outer teeth are meshed with the plurality of inner-tooth pins;
    a restriction member configured to restrict movement of the plurality of inner-tooth pins in the axial direction; and
    a bore formed in an end surface of the outer cylinder that faces the axial direction of the outer cylinder,
    wherein the restriction member is mounted to the outer cylinder on an outer side of the outer cylinder, and
    wherein the restriction member has a protrusion inserted into the bore in the end surface of the outer cylinder.

2. The gear device according to claim 1, wherein a length of the outer cylinder in the axial direction is equal to a length of the plurality of inner-tooth pins.

3. The gear device according to claim 1, wherein the restriction member is formed in a ring shape.

4. The gear device according to claim 2, wherein the restriction member is formed in a ring shape.

5. The gear device according to claim 1, further comprising: a seal member disposed at a position on an outer side in a radial direction of the outer cylinder with respect to the bore in the end surface of the outer cylinder and configured to prevent a liquid from leaking to the outer side in the radial direction of the outer cylinder.

6. The gear device according to claim 2, further comprising:
    a seal member disposed at a position on an outer side in a radial direction of the outer cylinder with respect to the bore in the end surface of the outer cylinder and configured to prevent a liquid from leaking to the outer side in the radial direction of the outer cylinder.

7. The gear device according to claim 3, further comprising:
    a seal member disposed at a position on an outer side in a radial direction of the outer cylinder with respect to the bore in the end surface of the outer cylinder and configured to prevent a liquid from leaking to the outer side in the radial direction of the outer cylinder.

8. The gear device according to claim 4, further comprising:
    a seal member disposed at a position on an outer side in a radial direction of the outer cylinder with respect to the bore in the end surface of the outer cylinder and configured to prevent a liquid from leaking to the outer side in the radial direction of the outer cylinder.

9. The gear device according to claim 1, further comprising: a bolt configured to fix the restriction member to an end surface of the outer cylinder which faces the axial direction.

10. The gear device according to claim 2, further comprising: a bolt configured to fix the restriction member to an end surface of the outer cylinder which faces the axial direction.

11. The gear device according to claim 3, further comprising: a bolt configured to fix the restriction member to an end surface of the outer cylinder which faces the axial direction.

12. The gear device according to claim 4, further comprising: a bolt configured to fix the restriction member to an end surface of the outer cylinder which faces the axial direction.

13. A gear device for transmitting a rotational force at a predetermined speed reduction ratio between a pair of counterpart members, the gear device comprising:

an outer cylinder fixable to one of the counterpart members and having a plurality of pin grooves in an inner peripheral surface thereof, the plurality of pin grooves extending in an axial direction of said outer cylinder;

a plurality of inner-tooth pins fitted into the plurality of pin grooves of the outer cylinder, respectively;

a carrier housed inside the outer cylinder and fixable to the other counterpart member;

a crankshaft rotatably supported on the carrier;

an oscillating gear having outer teeth meshed with the plurality of inner-tooth pins and configured to oscillate in conjunction with rotation of the crankshaft, while the outer teeth are meshed with the plurality of inner-tooth pins;

a restriction member configured to restrict movement of the plurality of inner tooth pins in the axial direction;

a bolt configured to fix the restriction member to an end surface of the outer cylinder which faces the axial direction; and a transmission gear fixed to an end portion of the crankshaft, wherein the restriction member is mounted to the outer cylinder on an outer side of the outer cylinder, a head portion of the bolt is disposed on one of end surfaces of the outer cylinder which is on an opposite side to the transmission gear.

14. A gear device for transmitting a rotational force at a predetermined speed reduction ratio between a pair of counterpart members, the gear device comprising:

an outer cylinder fixable to one of the counterpart members and having a plurality of pin grooves in an inner peripheral surface thereof, the plurality of pin grooves extending in an axial direction of said outer cylinder;

a plurality of inner-tooth pins fitted into the plurality of pin grooves of the outer cylinder, respectively;

a carrier housed inside the outer cylinder and fixable to the other counterpart member;

a crankshaft rotatably supported on the carrier;

an oscillating gear having outer teeth meshed with the plurality of inner-tooth pins and configured to oscillate in conjunction with rotation of the crankshaft, while the outer teeth are meshed with the plurality of inner-tooth pins;

a restriction member configured to restrict movement of the plurality of inner tooth pins in the axial direction; and a bolt configured to fix the restriction member to an end surface of the outer cylinder which faces the axial direction;

wherein the restriction member is mounted to the outer cylinder on an outer side of the outer cylinder, wherein the restriction member comprises a first restriction member and a second restriction member disposed on end surfaces of the outer cylinder on both sides thereof in the axial direction, respectively, wherein the first restriction member has a through hole into which a shaft portion of the bolt can be inserted, and wherein the second restriction member has a female screw hole that can be screwed onto a male screw portion formed at a distal end of the shaft portion of the bolt.

* * * * *